(12) United States Patent
Shimizu et al.

(10) Patent No.: US 7,555,373 B2
(45) Date of Patent: Jun. 30, 2009

(54) HYBRID VEHICLE AND CONTROL METHOD OF HYBRID VEHICLE

(75) Inventors: Yasuo Shimizu, Toki (JP); Hideto Watanabe, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 357 days.

(21) Appl. No.: 11/658,275

(22) PCT Filed: Mar. 3, 2006

(86) PCT No.: PCT/JP2006/304684

§ 371 (c)(1),
(2), (4) Date: Jan. 24, 2007

(87) PCT Pub. No.: WO2006/109379

PCT Pub. Date: Oct. 19, 2006

(65) Prior Publication Data

US 2009/0005923 A1      Jan. 1, 2009

(30) Foreign Application Priority Data

Mar. 3, 2005 (JP) ............................. 2005-058747

(51) Int. Cl.
*G05D 3/00* (2006.01)
*G06F 7/00* (2006.01)
(52) U.S. Cl. ..................... 701/22; 701/84; 477/107; 903/917; 903/942
(58) Field of Classification Search ............... 701/22, 701/52, 56, 84; 477/97, 107; 180/174; 903/902, 903/916, 917, 921, 942; 324/160; 475/123
See application file for complete search history.

(56) References Cited

U.S. PATENT DOCUMENTS

| 5,967,940 | A | 10/1999 | Yamaguchi |
| 6,372,883 | B1* | 4/2002 | Attwood et al. ............. 530/329 |
| 6,569,059 | B1 | 5/2003 | Ito |
| 7,213,665 | B2* | 5/2007 | Yamaguchi et al. ........ 180/65.2 |
| 7,237,634 | B2* | 7/2007 | Severinsky et al. ......... 180/65.2 |
| 2004/0040375 | A1 | 3/2004 | Kadota et al. |
| 2005/0016781 | A1 | 1/2005 | Muta |

FOREIGN PATENT DOCUMENTS

| EP | 1 393 951 A2 | 3/2004 |
| JP | A 6-261419 | 9/1994 |
| JP | A 2004-143957 | 5/2004 |
| WO | WO 2004/113112 A1 | 12/2004 |

* cited by examiner

*Primary Examiner*—Gertrude Arthur Jeanglaud
(74) *Attorney, Agent, or Firm*—Oliff & Berridge, PLC (57) ABSTRACT

In a hybrid vehicle equipped with an engine and a motor that are connected to a driveshaft linked to an axle via a gear mechanism, on condition that an output torque of the motor (previous Tm2*) is not lower than a preset reference output torque Tm2ref (step S190) at a moment of a start requirement of the engine (steps S130 and S180), the drive control of the invention starts the engine (step S220). On conditions that the output torque of the motor (previous Tm2*) is lower than the preset reference output torque Tm2ref (step S190), that a torque demand Tr* is lower than a preset reference torque level Tref (step S200), and that a state of charge SOC of a battery is not lower than a preset reference charge level Sref (step S210), the drive control keeps the engine at a stop (step S140), regardless of the start requirement. This arrangement effectively reduces the potential for backlash or gear rattle in the gear mechanism due to a torque pulsation applied to the driveshaft at a start of the engine.

13 Claims, 5 Drawing Sheets

HYBRID VEHICLE AND CONTROL METHOD OF HYBRID VEHICLE

TECHNICAL FIELD

The present invention relates to a hybrid vehicle and a control method of the hybrid vehicle.

BACKGROUND ART

In a proposed hybrid vehicle where an internal combustion engine and a motor MG1 are connected via a planetary gear unit to a driveshaft, which is linked with an axle via a gear mechanism, and a motor MG2 is connected to the driveshaft, a start mode of the engine is selected according to whether a start requirement of the engine is based on the driver's intention (see, for example, Japanese Patent Laid-Open Gazette No. 2004-143957). On a start of the engine according to the driver's intention, for example, in response to the driver's requirement of a power demand, this proposed hybrid vehicle drives and controls the motor MG1 with a relatively large cranking torque. On a start of the engine independently of the driver's intention, for example, in response to a decrease in state of charge of a battery to or below a preset level, on the other hand, this hybrid vehicle drives and controls the motor MG1 with a relatively small cranking torque. Such control reduces the potential torque shock at a start of the engine independently of the driver's intention.

DISCLOSURE OF THE INVENTION

In addition to reduction of the potential torque shock at a start of the engine, another important challenge in the hybrid vehicle is reduction of the potential for backlash or gear rattle in the gear mechanism at the start of the engine. The hybrid vehicle is naturally required to respond to the driver's demand. The simultaneous pursuit of these requirements in the hybrid vehicles is thus highly demanded.

The hybrid vehicle of the invention and the control method of the hybrid vehicle thus aim to reduce the potential for backlash or gear rattle in a gear mechanism at a start of an internal combustion engine. The hybrid vehicle of the invention and the control method of the hybrid vehicle also aim to respond to the driver's demand. The hybrid vehicle of the invention and the control method of the hybrid vehicle further aim to prevent an accumulator unit from being discharged excessively.

In order to attain at least part of the above and the other related objects, the hybrid vehicle of the invention and the control method of the hybrid vehicle have the configurations discussed below.

The present invention is directed to a hybrid vehicle equipped with an internal combustion engine that is structured to output power to a driveshaft linked to an axle and with a motor that inputs and outputs power.

The hybrid vehicle includes: an electric power-mechanical power input output mechanism that is connected to an output shaft of the internal combustion engine and to the driveshaft and outputs at least part of the output power of the internal combustion engine to the driveshaft through input and output of electric power and mechanical power; a gear-based power transmission structure that connects the driveshaft with a rotating shaft of the motor via a gear mechanism to enable transmission of power between the driveshaft and the rotating shaft; an accumulator unit that is capable of inputting and outputting electric power from and to the motor and the electric power-mechanical power input output mechanism; a driving force demand setting module that sets a driving force demand to be output to the driveshaft; a stop-start requirement module that gives a stop requirement of the internal combustion engine upon satisfaction of a preset operation stop condition and gives a start requirement of the internal combustion engine upon satisfaction of a preset operation start condition; and a control module that, on condition that a degree of backlash adjustment in the gear mechanism satisfies a predetermined condition at a moment of the start requirement given by said stop-start requirement module, controls the internal combustion engine, the electric power-mechanical power input output mechanism, and the motor to start the internal combustion engine and to ensure output of a driving force equivalent to the set driving force demand to the driveshaft, while on condition that the degree of backlash adjustment in the gear mechanism fails to satisfy the predetermined condition at the moment of the start requirement, controlling the internal combustion engine, the electric power-mechanical power input output mechanism, and the motor to keep the internal combustion engine at a stop regardless of the start requirement and to ensure output of the driving force equivalent to the set driving force demand to the driveshaft.

On condition that the degree of backlash adjustment in the gear mechanism satisfies the predetermined condition at the moment of the start requirement given upon satisfaction of the preset operation start condition, the hybrid vehicle of the invention controls the internal combustion engine, the electric power-mechanical power input output mechanism, and the motor to start the internal combustion engine and to ensure output of a driving force equivalent to a driving force demand to the driveshaft. On condition that the degree of backlash adjustment in the gear mechanism fails to satisfy the predetermined condition at the moment of the start requirement given upon satisfaction of the preset operation start condition, the hybrid vehicle of the invention controls the internal combustion engine, the electric power-mechanical power input output mechanism, and the motor to keep the internal combustion engine at a stop regardless of the start requirement and to ensure output of the driving force equivalent to the set driving force demand to the driveshaft. This arrangement effectively reduces the potential for backlash or gear rattle in the gear mechanism at a start of the internal combustion engine and thereby maintains the good drivability.

In one preferable application of the hybrid vehicle of the invention, on condition that an output torque of the motor is not lower than a preset reference torque level at the moment of the start requirement, the control module specifies that the degree of backlash adjustment in the gear mechanism satisfies the predetermined condition and controls the internal combustion engine, the electric power-mechanical power input output mechanism, and the motor to start the internal combustion engine. On condition that the output torque of the motor is lower than the preset reference torque level at the moment of the start requirement, the control module specifies that the degree of backlash adjustment in the gear mechanism fails to satisfy the predetermined condition and controls the internal combustion engine, the electric power-mechanical power input output mechanism, and the motor to keep the internal combustion engine at a stop. This arrangement ensures the appropriate determination of whether the degree of backlash adjustment in the gear mechanism satisfies the predetermined condition.

In another preferable application of the hybrid vehicle of the invention, on condition that the set driving force demand is not lower than a preset reference driving force level at the moment of the start requirement, the control module controls the internal combustion engine, the electric power-mechanical power input output mechanism, and the motor to start the internal combustion engine, independently of the degree of backlash adjustment in the gear mechanism. This arrangement desirably responds to the driver's demand.

In still another preferable application of the hybrid vehicle of the invention, on condition that a state of charge of the accumulator unit is lower than a preset reference charge level at the moment of the start requirement, the control module controls the internal combustion engine, the electric power-mechanical power input output mechanism, and the motor to start the internal combustion engine, independently of the degree of backlash adjustment in the gear mechanism. This arrangement desirably prevents the accumulator unit from being discharged excessively. Under control to keep the internal combustion engine at a stop on conditions that the state of charge of the accumulator unit is not lower than the preset reference charge level and that the degree of backlash adjustment in the gear mechanism fails to satisfy the predetermined condition at the moment of the start requirement, when the state of charge of the accumulator unit decreases below the preset reference charge level, the control module may control the internal combustion engine, the electric power-mechanical power input output mechanism, and the motor to start the internal combustion engine, independently of the degree of backlash adjustment in the gear mechanism.

In one preferable embodiment of the invention, the hybrid vehicle further includes a power demand setting module that sets a power demand required for the driveshaft, based on the set driving force demand. The stop-start requirement module sets a reference power level to decrease with a decrease in state of charge of the accumulator unit and, when the set power demand is higher than the reference power level, specifies satisfaction of the preset operation start condition to give the start requirement of the internal combustion engine. This arrangement facilitates satisfaction of the preset operation start condition at the lower state of charge of the accumulator unit.

In another preferable application of the hybrid vehicle, the electric power-mechanical power input output mechanism includes: a three shaft-type power input output module that is linked to three shafts, the output shaft of the internal combustion engine, the driveshaft, and the rotating shaft of the motor, and automatically inputs and outputs power from and to a residual one shaft based on powers input from and output to any two shafts among the three shafts; and another motor that is capable of inputting and outputting power from and to the rotating shaft. The electric power-mechanical power input output mechanism includes: a pair-rotor motor that has a first rotor connected to the output shaft of the internal combustion engine and a second rotor connected to the driveshaft, and is driven to rotate through relative rotation of the first rotor to the second rotor.

The present invention is directed to a control method of a hybrid vehicle including: an internal combustion engine; an electric power-mechanical power input output mechanism that is connected to an output shaft of the internal combustion engine and to a driveshaft and outputs at least part of output power of the internal combustion engine to the driveshaft through input and output of electric power and mechanical power; a motor that inputs and outputs power; a gear-based power transmission structure that connects the driveshaft with a rotating shaft of the motor via a gear mechanism to enable transmission of power between the driveshaft and the rotating shaft; and an accumulator unit that is capable of inputting and outputting electric power from and to the motor and the electric power-mechanical power input output mechanism. On condition that a degree of backlash adjustment in the gear mechanism satisfies a predetermined condition at a moment of a start requirement of the internal combustion engine given upon satisfaction of a preset operation start condition, the control method controls the internal combustion engine, the electric power-mechanical power input output mechanism, and the motor to start the internal combustion engine and to ensure output of a driving force equivalent to a preset driving force demand to the driveshaft. On condition that the degree of backlash adjustment in the gear mechanism fails to satisfy the predetermined condition at the moment of the start requirement, the control method controls the internal combustion engine, the electric power-mechanical power input output mechanism, and the motor to keep the internal combustion engine at a stop regardless of the start requirement and to ensure output of the driving force equivalent to the preset driving force demand to the driveshaft.

On condition that the degree of backlash adjustment in the gear mechanism satisfies the predetermined condition at the moment of the start requirement given upon satisfaction of the preset operation start condition, the control method of the invention controls the internal combustion engine, the electric power-mechanical power input output mechanism, and the motor to start the internal combustion engine and to ensure output of a driving force equivalent to a driving force demand to the driveshaft. On condition that the degree of backlash adjustment in the gear mechanism fails to satisfy the predetermined condition at the moment of the start requirement given upon satisfaction of the preset operation start condition, the control method of the invention controls the internal combustion engine, the electric power-mechanical power input output mechanism, and the motor to keep the internal combustion engine at a stop regardless of the start requirement and to ensure output of the driving force equivalent to the set driving force demand to the driveshaft. This arrangement effectively reduces the potential for backlash or gear rattle in the gear mechanism at a start of the internal combustion engine and thereby maintains the good drivability.

In one preferable embodiment of the invention, on condition that an output torque of the motor is not lower than a preset reference torque level at the moment of the start requirement, the control method specifies that the degree of backlash adjustment in the gear mechanism satisfies the predetermined condition and controls the internal combustion engine, the electric power-mechanical power input output mechanism, and the motor to start the internal combustion engine. On condition that the output torque of the motor is lower than the preset reference torque level at the moment of the start requirement, the control method specifies that the degree of backlash adjustment in the gear mechanism fails to satisfy the predetermined condition and controls the internal combustion engine, the electric power-mechanical power input output mechanism, and the motor to keep the internal combustion engine at a stop. This arrangement ensures the appropriate determination of whether the degree of backlash adjustment in the gear mechanism satisfies the predetermined condition.

In another preferable embodiment of the invention, on condition that the set driving force demand is not lower than a preset reference driving force level at the moment of the start requirement, the control method controls the internal combustion engine, the electric power-mechanical power input output mechanism, and the motor to start the internal combustion engine, independently of the degree of backlash adjustment in the gear mechanism. This arrangement desirably responds to the driver's demand.

In still another preferable embodiment of the invention, on condition that a state of charge of the accumulator unit is lower than a preset reference charge level at the moment of the start requirement, the control method controls the internal combustion engine, the electric power-mechanical power input output mechanism, and the motor to start the internal combustion engine, independently of the degree of backlash adjustment in the gear mechanism. This arrangement desirably prevents the accumulator unit from being discharged excessively. Under control to keep the internal combustion engine at a stop on conditions that the state of charge of the accumulator unit is not lower than the preset reference charge level and that the degree of backlash adjustment in the gear mechanism fails to satisfy the predetermined condition at the moment of the start requirement, when the state of charge of the accumulator unit decreases below the preset reference charge level, the control module may control the internal combustion engine, the electric power-mechanical power input output mechanism, and the motor to start the internal combustion engine, independently of the degree of backlash adjustment in the gear mechanism.

BEST MODES OF CARRYING OUT THE INVENTION

Figure 1:
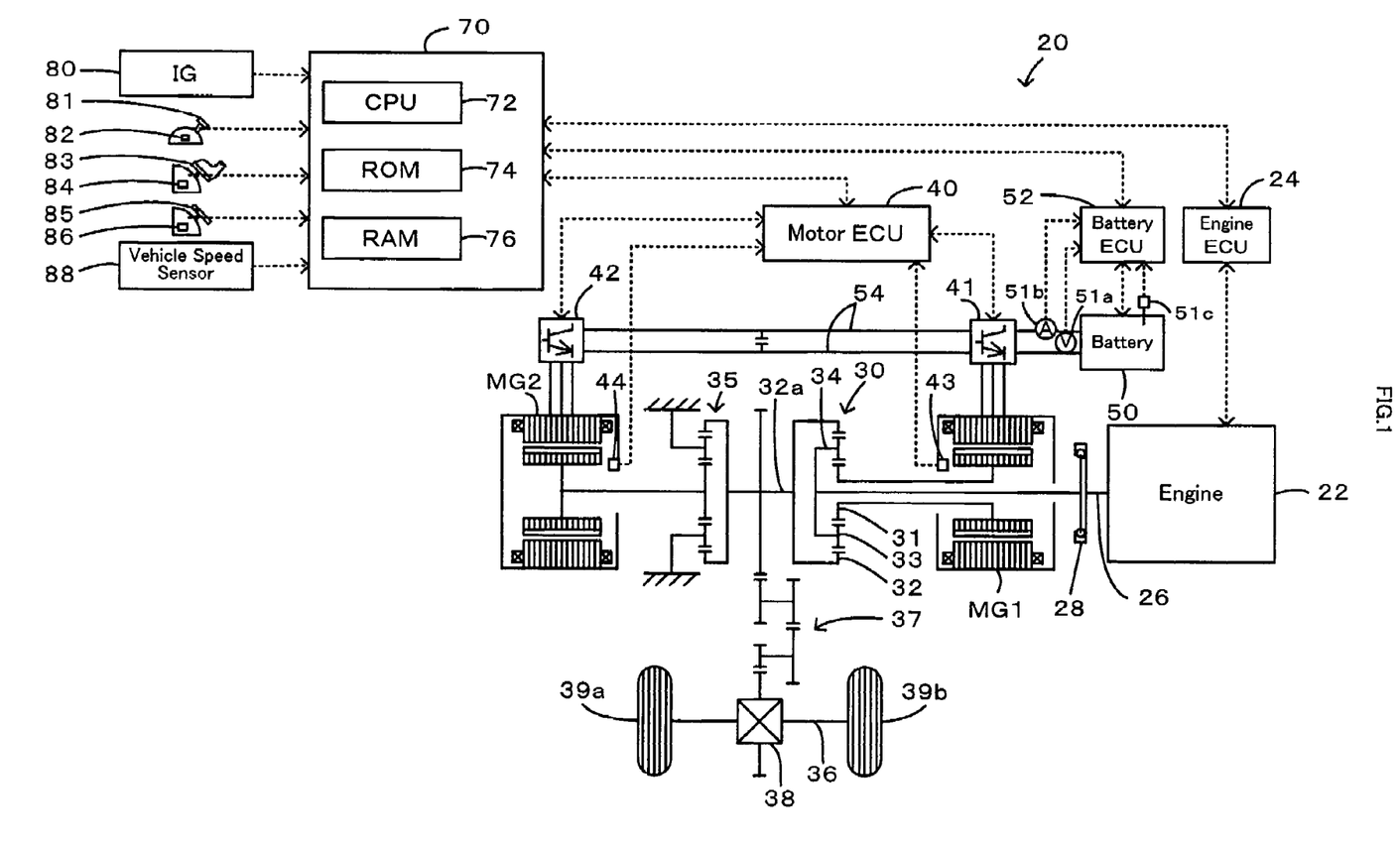
FIG. 1 schematically illustrates the configuration of a hybrid vehicle in one embodiment of the invention.

One mode of carrying out the invention is discussed below as a preferred embodiment. FIG. 1 schematically illustrates the construction of a hybrid vehicle 20 in one embodiment of the invention. As illustrated, the hybrid vehicle 20 of the embodiment includes an engine 22, a three shaft-type power distribution integration mechanism 30 that is linked with a crankshaft 26 functioning as an output shaft of the engine 22 via a damper 28, a motor MG1 that is linked with the power distribution integration mechanism 30 and is capable of generating electric power, another motor MG2 that is linked with the power distribution integration mechanism 30 via the reduction gear 35 and a hybrid electronic control unit 70 that controls the whole power output apparatus.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, the differential gear 38, and the axle 36 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, signals from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 executes a rotation speed computation routine (not shown) to calculate rotation speeds Nm1 and Nm2 of the respective rotors in the motors MG1 and MG2 from the input signals of the rotational position detection sensors 43 and 44. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage Vb measured by a voltage sensor 51a disposed between terminals of the battery 50, a charge-discharge current Ib measured by a current sensor 51b attached to the power line 54 connected with the output terminal of the battery 50, and a battery temperature Tb measured by a temperature sensor 51c attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current Ib measured by the current sensor 51b, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, and a vehicle speed V from a vehicle speed sensor 88. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
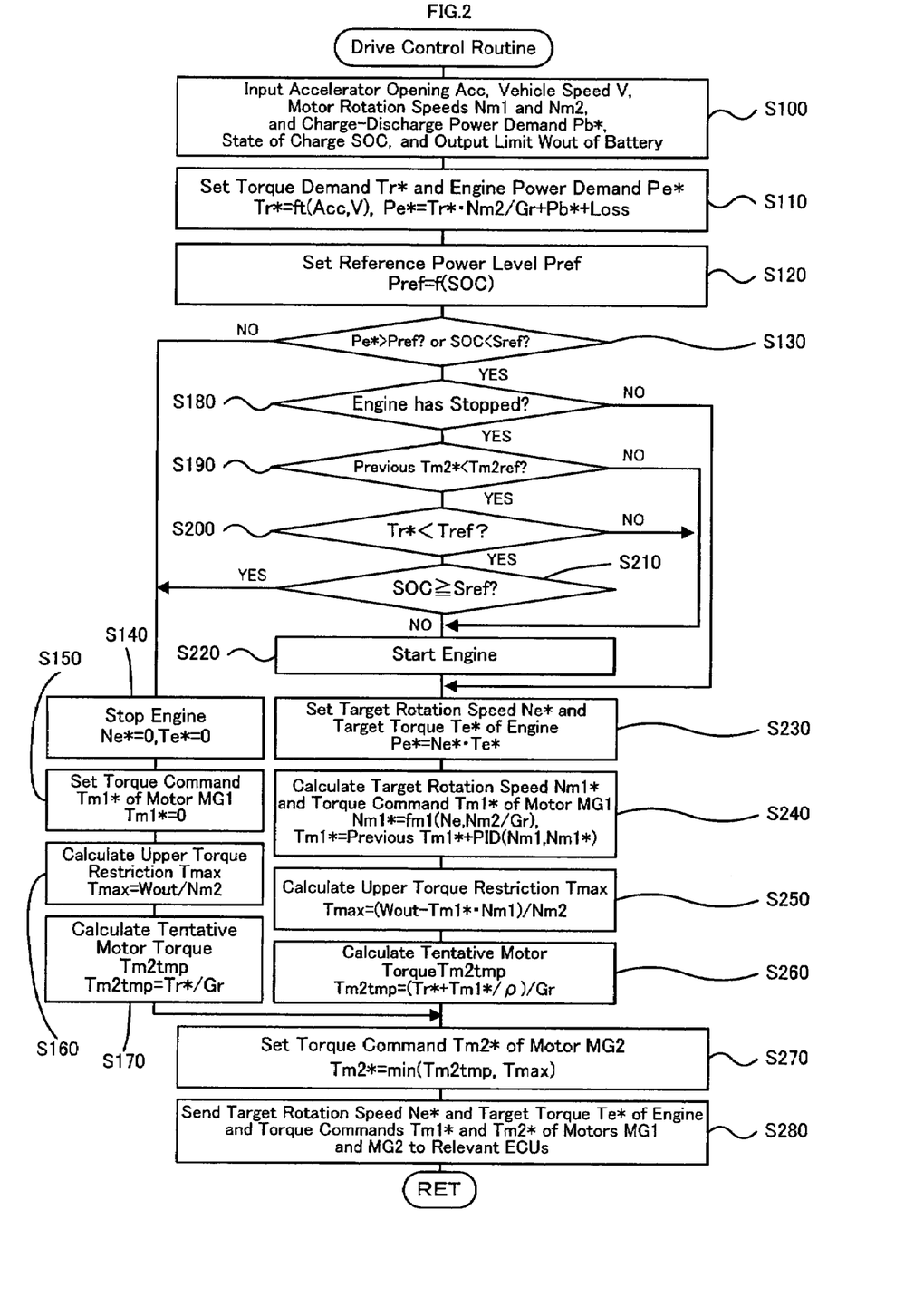
FIG. 2 is a flowchart showing a drive control routine executed by a hybrid electronic control unit included in the hybrid vehicle of the embodiment.

The description regards a series of control operations of the hybrid vehicle 20 of the embodiment having the configuration discussed above. FIG. 2 is a flowchart showing a drive control routine executed by the hybrid electronic control unit 70. This drive control routine is performed repeatedly at preset time intervals, for example, at every several msec.

In the drive control routine, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, the state of charge SOC of the battery 50, a charge-discharge power demand Pb* to be charged into the battery 50 or to be discharged from the battery 50, and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The state of charge SOC of the battery 50 is computed from the accumulated charge-discharge current Ib of the battery 50 measured by the electric current sensor 51b and is received from the battery ECU 52 by communication. The charge-discharge power demand Pb* of the battery 50 is set based on the state of charge SOC of the battery 50 and is received from the battery ECU 52 by communication. The output limit Wout of the battery 50 is set based on the battery temperature Tb and the state of charge SOC and is received from the battery ECU 52 by communication.

Figure 3:
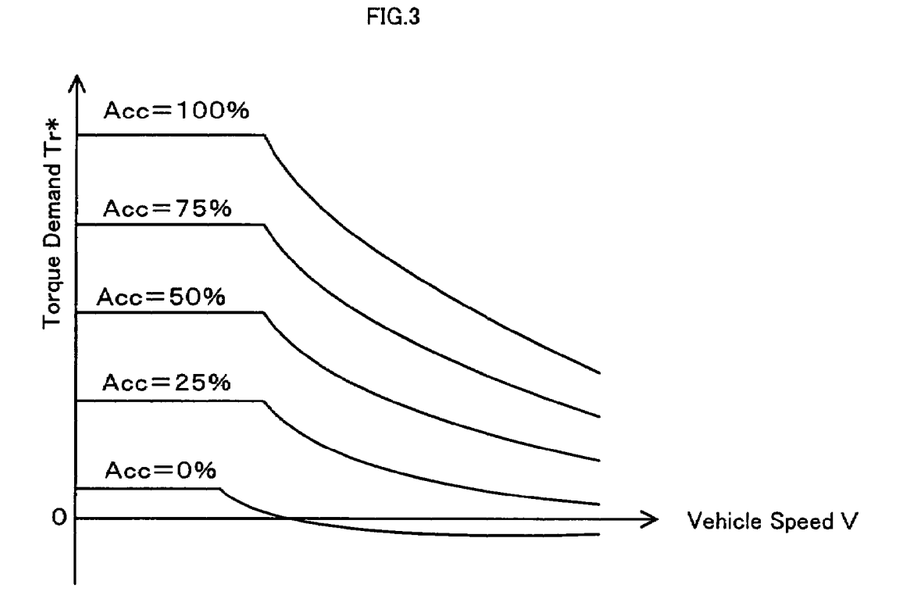
FIG. 3 shows one example of a torque demand setting map.

After the data input, the CPU 72 sets a torque demand Tr* to be output to the ring gear shaft 32a or the driveshaft and an engine power demand Pe* required for the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 3. The engine power demand Pe* is calculated as the sum of the product of the torque demand Tr* and the rotation speed Nr of the ring gear shaft 32a, the charge-discharge power demand Pb* to be charged into or discharged from the battery 50, and a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a conversion factor k.

Figure 4:
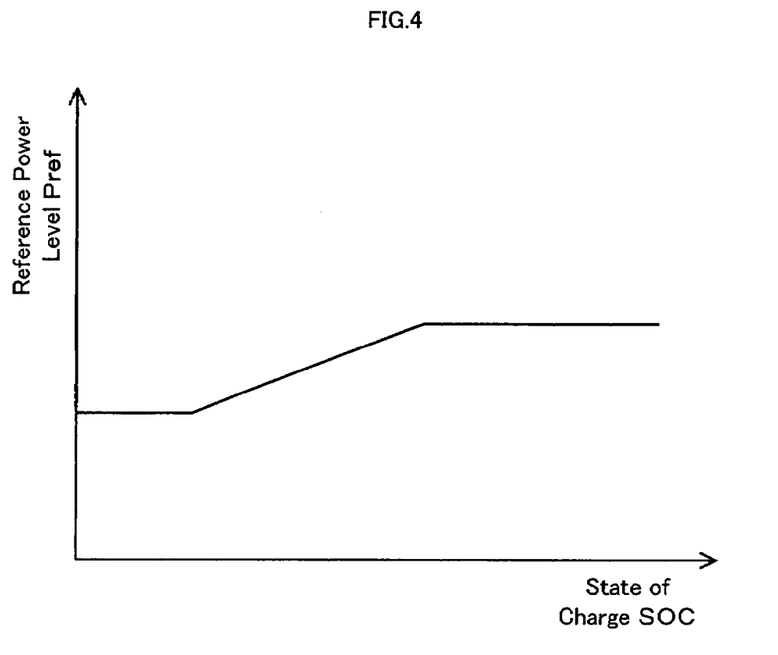
FIG. 4 is a map showing a variation in reference power level Pref against the state of charge SOC of a battery.

The CPU 72 subsequently sets a reference power level Pref based on the state of charge SOC of the battery 50 (step S120) and makes comparisons between the engine power demand Pe* and the reference power level Pref and between the state of charge SOC of the battery 50 and a preset reference charge level Sref (step S130). The results of these comparisons specify the requirement or non-requirement for operation of the engine 22. The reference power level Pref is used as a criterion to specify the requirement or non-requirement for operation of the engine 22 based on the driver's demand. A concrete procedure of setting the reference power level Pref in this embodiment stores in advance a variation in reference power level Pref against the state of charge SOC of the battery 50 as a map in the ROM 74 and reads the reference power level Pref corresponding to the given state of charge SOC from the map. The map of FIG. 4 shows the variation in reference power level Pref against the state of charge SOC of the battery 50 as an example. In this illustration map, the reference power level Pref is set to decrease with a decrease in state of charge SOC of the battery 50. The lower state of charge SOC of the battery 50 results in the higher potential for keeping the operating engine 22 in its operating state and the higher potential for satisfying the condition of a start requirement of the engine 22 at a stop. The reason of these settings of the reference power level Pref will be described later. The reference charge level Sref is used as a criterion to specify the requirement or non-requirement for operation of the engine 22 based on the state of charge SOC of the battery 50, and depends upon the characteristics of the battery 50.

When the engine power demand Pe* is not higher than the preset reference power level Pref and when the state of charge SOC of the battery 50 is not lower than the preset reference charge level Sref at step S130, the CPU 72 specifies the requirement for stop of the engine 22. The CPU 72 accordingly sets both a target rotation speed Ne* and a target torque Te* of the engine 22 to '0' (step S140) and sets a torque command Tm1* of the motor MG1 to '0' (step S150). The CPU 72 then divides the output limit Wout of the battery 50 by the rotation speed Nm2 of the motor MG2 to calculate an upper torque restriction Tmax as a maximum possible torque output from the motor MG2 (step S160), and divides the torque demand Tr* by the gear ratio Gr of the reduction gear 35 to calculate a tentative motor torque Tm2tmp as a torque to be output from the motor MG2 (step S170). A torque command Tm2* of the motor MG2 is set by limiting the calculated tentative motor torque Tm2tmp to the upper torque restriction Tmax (step S270). Such setting of the torque command Tm2* of the motor MG2 restricts the torque demand Tr* to be output to the ring gear shaft 32a or the driveshaft in the range of the output limit Wout of the battery 50.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S280) and exits from this drive control routine. The engine ECU 24 receives the target rotation speed Ne* and the target torque Te* both set equal to '0' and stops the operating engine 22 or keeping the engine 22 at a stop. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

Figure 5:
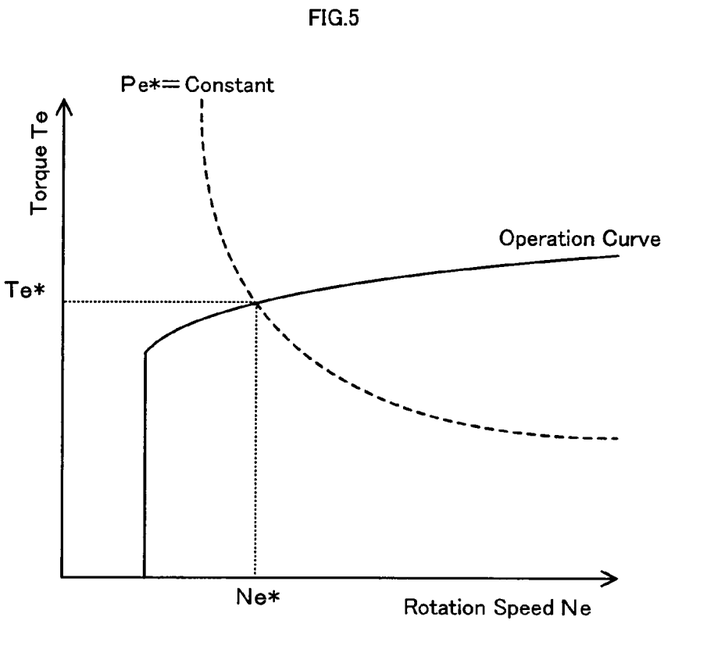
FIG. 5 shows an efficient operation line of an engine to set a target rotation speed Ne* and a target torque Te*.

When the engine power demand Pe* is higher than the preset reference power level Pref or when the state of charge SOC of the battery 50 is lower than the preset reference charge level Sref at step S130, on the other hand, the CPU 72 specifies the requirement for operation of the engine 22. The CPU 72 then determines whether the engine 22 has stopped (step S180). When it is determined at step S180 that the engine 22 has not stopped but operates, the CPU 72 sets the target rotation speed Ne* and the target torque Te* of the engine 22 corresponding to the engine power demand Pe* (step S230). The target rotation speed Ne* and the target torque Te* of the engine 22 are determined according to an efficient operation curve of ensuring efficient operation of the engine 22 and a curve of the engine power demand Pe*. FIG. 5 shows an efficient operation curve of the engine 22 to set the target rotation speed Ne* and the target torque Te*. As clearly shown in FIG. 5, the target rotation speed Ne* and the target torque Te* are given as an intersection of the efficient operation curve and a curve of constant engine power demand Pe*(=Ne*×Te*).

After setting the target rotation speed Ne* and the target torque Te* of the engine 22, the CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating the torque command Tm1* of the motor MG1 from the calculated target rotation speed Nm1* and the current rotation speed Nm1 of the motor MG1 according to Equation (2) given below (step S240):

$$Nm1^* = Ne^* \cdot (1+\rho)/\rho - Nm2/(Gr \cdot \rho) \quad (1)$$

$$Tm1^* = \text{Previous } Tm1^* + k1(Nm1^* - Nm1) + k2\int(Nm1^* - Nm1)dt \quad (2)$$

Figure 6:
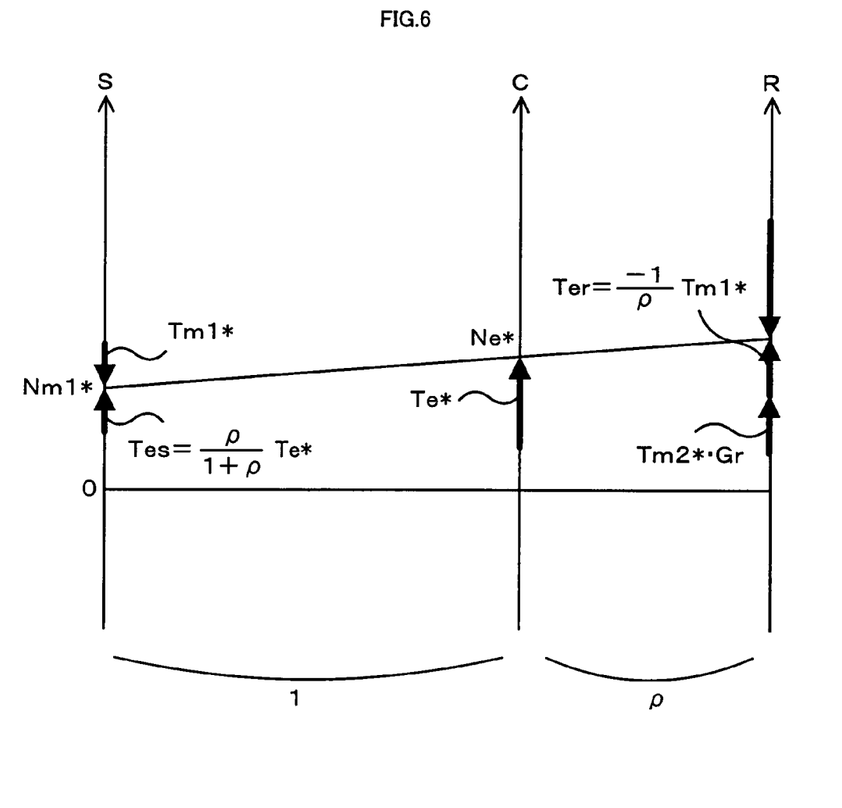
FIG. 6 is an alignment chart showing torque-rotation speed dynamics of respective rotational elements included in a power distribution integration mechanism in the hybrid vehicle of the embodiment.

Equation (1) is a dynamic relational expression of the rotational elements included in the power distribution integration mechanism 30. FIG. 6 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a). The target rotation speed Nm1* of the motor MG1 is thus readily obtained according to the torque-rotation speed dynamics of this alignment chart. Drive control of the motor MG1 with the settings of the torque command Tm1* and the target rotation speed Nm1* enables rotation of the engine 22 at the target rotation speed Ne*. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. Two upward thick arrows on the axis 'R' in FIG. 6 respectively show a torque that is directly transmitted to the ring gear shaft 32a when the torque Te* is output from the engine 22, and a torque that is applied to the ring gear shaft 32a via the reduction gear 35 when the torque Tm2* is output from the motor MG2.

After calculation of the target rotation speed Nm1* and the torque command Tm1* of the motor MG1, the CPU 72 calculates the upper torque restriction Tmax according to Equation (3) given below (step S250). The calculation subtracts the product of the calculated torque command Tm1* and the current rotation speed Nm1 of the motor MG1, which represents the power consumption (power generation) of the motor MG1, from the output limit Wout of the battery 50 and divides the difference by the current rotation speed Nm2 of the motor MG2:

$$Tmax = (Wout - Tm1^* \cdot Nm1)/Nm2 \quad (3)$$

The CPU 72 then calculates the tentative motor torque Tm2tmp from the torque demand Tr*, the torque command Tm1* of the motor MG1, the gear ratio ρ of the power distribution integration mechanism 30, and the gear ratio Gr of the reduction gear 35 according to Equation (4) given below (step S260):

$$Tm2tmp = (Tr^* + Tm1^*/\rho)/Gr \quad (4)$$

The torque command Tm2* of the motor MG2 is set by limiting the calculated tentative motor torque Tm2tmp to the upper torque restriction Tmax (step S270). Equation (4) is readily led from the alignment chart of FIG. 6.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S280) and exits from this drive control routine. The engine ECU 24 receives the target rotation speed Ne* and the target torque Te* and starts the engine 22 while performing fuel injection control and ignition control to drive the engine 22 at a specified drive point of the target rotation speed Ne* and the target torque Te*.

When it is determined at step S180 that the engine 22 has stopped, on the other hand, the CPU 72 specifies the requirement for start of the engine 22 and compares a previous setting of the torque command Tm2*(previous Tm2*) of the motor MG2 in the previous cycle of this drive control routine as the output torque of the motor MG2 with a preset reference output torque Tm2ref (step S190). The reference output torque Tm2ref is used as a criterion to determine whether the gear mechanism 37 and the differential gear 38 have backlash adjustment, that is, whether there is substantially no possibility of backlash or gear rattle in the gear mechanism 37 or in the differential gear 38. In this embodiment, the reference output torque Tm2ref is set by dividing a torque practically equivalent to a maximum amplitude of torque pulsation applied to the ring gear shaft 32a or the driveshaft at a start of the engine 22 or a greater torque by the gear ratio Gr of the reduction gear 35. In the process of motoring the engine 22 by the motor MG1 to start the engine 22, the torque pulsation due to the reciprocating motions of pistons or frictions of the pistons in the engine 22 is applied to the ring gear shaft 32a or the driveshaft. When a relatively low torque is output from the motor MG2 to the ring gear shaft 32a, the torque pulsation may reverse the positive/negative torque output to the ring gear shaft 32a. This may cause backlash or gear rattle in the gear mechanism 37 or in the differential gear 38. The processing of step S190 determines whether there is a potential for backlash or gear rattle in the gear mechanism 37 or in the differential gear 38. When the output torque of the motor MG2 (previous Tm2*) is not lower than the preset reference output torque Tm2ref at step S190, the CPU 72 determines that the gear mechanism 37 and the differential gear 38 have backlash adjustment and there is substantially no possibility of backlash or gear rattle in the gear mechanism 37 or in the differential gear 38. The CPU 72 then starts the engine (step S220) and performs the subsequent processing of and after step S230.

When the output torque of the motor MG2 (previous Tm2*) is lower than the preset reference output torque Tm2ref at step S190, on the other hand, the CPU 72 compares the torque demand Tr* with a preset reference torque level Tref (step S200). The reference torque level Tref is used as a criterion to specify the requirement or non-requirement for output of a relatively large torque to the ring gear shaft 32a or the driveshaft. There is a requirement for output of a relatively large torque to the ring gear shaft 32a, for example, when the driver depresses the accelerator pedal 83 to a relatively large depth. The reference torque level Tref depends upon the characteristics of the hybrid vehicle 20. When the torque demand Tr* is not lower than the preset reference torque level Tref at step S200, the CPU 72 specifies the requirement for output of a relatively large torque to the ring gear shaft 32a or the driveshaft. The CPU 72 then starts the engine 22 (step S220) and performs the subsequent processing of and after step S230. This responds to the driver's acceleration demand. In this state, there is a certain possibility of backlash or gear rattle in the gear mechanism 37 or in the differential gear 38. The potential backlash or gear rattle is, however, allowed since the driver makes the acceleration demand. When the torque demand Tr* is lower than the preset reference torque level Tref at step S200, on the other hand, the CPU 72 compares the state of charge SOC of the battery 50 with the preset reference charge level Sref (step S210). The reference charge level Sref used as the criterion of determination at step S210 is identical with the reference charge level Sref at step S130 in this embodiment, although different values may be set to the reference charge level Sref. When the state of charge SOC of the battery 50 is not lower than the preset reference charge level Sref at step S210, the drive control routine goes to step S140. In this state, the required torque to be output to the ring gear shaft 32a or the driveshaft is not significantly high and the battery 50 has the sufficiently high charge level as the state of charge SOC, whereas there is a certain possibility of backlash or gear rattle in the gear mechanism 37 or in the differential gear 38 at a start of the engine 22. The CPU 72 then sets both the target rotation speed Ne* and the target torque Te* of the engine 22 to '0' to keep the engine 22 at a stop regardless of the start requirement of the engine 22 (step S140) and performs the subsequent processing of and after step S150. This control effectively reduces the potential for backlash or gear rattle in the gear mechanism 37 or in the differential gear 38 due to the torque pulsation applied to the ring gear shaft 32a or the driveshaft at a start of the engine 22. When the state of charge SOC of the battery 50 is lower than the preset reference charge level Sref at step S210, on the other hand, the CPU 72 starts the engine 22 (step S220) and performs the subsequent processing of and after step S230. This effectively prevents the battery 50 from being excessively discharged. Under control to keep the engine 22 at a stop (step S140) regardless of the start requirement of the engine 22 (steps S130 and S180: Yes) on conditions that the output torque of the motor MG2 (previous Tm2*) is lower than the preset reference output torque Tm2ref (step S190: Yes), that the torque demand Tr* is lower than the preset reference torque level Tref (step S200: Yes), and that the state of charge SOC of the battery 50 is not lower than the preset reference charge level Sref (step S210: Yes), when the state of charge SOC of the battery 50 decreases below the preset reference charge level Sref, the drive control routine starts the engine 22 independently of the torque demand Tr* and the output torque of the motor MG2 (previous Tm2*). On a start of the engine 22 according to the state of charge SOC of the battery 50, there is a certain possibility of backlash or gear rattle in the gear mechanism 37 or in the differential gear 38. For the better drivability, it is preferable to minimize the start of the engine 22 according to the state of charge SOC of the battery 50. Because of this reason, the reference power level Pref is set to decrease with a decrease in state of charge SOC of the battery 50 at step S120. At the lower state of charge SOC of the battery 50, such setting of the reference power level Pref ensures the higher potential for keeping the operating engine 22 in its operating state to prevent a further decrease in state of charge SOC of the battery 50, while ensuring the higher potential for satisfying the condition of a start requirement of the engine 22 at a stop to reduce the frequency of starting the engine 22 according to the lowered state of charge SOC of the battery 50.

In the hybrid vehicle 20 of the embodiment described above, on condition that the output torque of the motor MG2 (previous Tm2*) is not lower than the preset reference output torque Tm2ref, which is used as the criterion for specification of backlash adjustment, at the moment of a start requirement of the engine 22, the drive control starts the engine 22. On condition that the output torque of the motor MG2 (previous Tm2*) is lower than the preset reference output torque Tm2ref, the drive control does not start the engine 22. This arrangement effectively reduces the potential for backlash or gear rattle in the gear mechanism 37 or in the differential gear 38. The drive control starts the engine 22 on condition that the torque demand Tr* is not lower than the preset reference torque level Tref or on condition that the state of charge SOC of the battery 50 is lower than the preset reference charge level Sref, even when the output torque of the motor MG2 (previous Tm2*) is lower than the preset reference output torque Tm2ref. The start of the engine 22 on the former condition desirably responds to the driver's acceleration demand, while the start of the engine 22 on the latter condition effectively prevents the battery 50 from being excessively discharged.

In the hybrid vehicle 20 of the embodiment, the reference power level Pref used as the criterion to specify the requirement or non-requirement for operation of the engine 22 is set to decrease with a decrease in state of charge SOC of the battery 50. Such setting ensures the higher potential for keeping the operating engine 22 in its operating state and the higher potential for satisfying the condition of a start requirement of the engine 22 at a stop, at the lower state of charge SOC of the battery 50. The former desirably prevents a further decrease in state of charge SOC of the battery 50, whereas the latter effectively reduces the frequency of starting the engine 22 according to the lowered state of charge SOC of the battery 50.

The hybrid vehicle 20 of the embodiment executes the drive control routine of FIG. 2 to start the engine 22 upon satisfaction of any of the start conditions at steps S190 to S210 in response to specification of the requirement for start of the engine 22 (steps S130 and S180). A modified flow of the drive control routine may set a stop condition of the engine 22, in response to specification of the requirement for stop of the engine 22, according to the start condition (steps S190 to S210) satisfied to start the engine 22. For example, when the engine 22 starts according to the state of charge SOC of the battery 22 (steps S210 and S220), the stop condition of the engine 22 is that the state of charge SOC of the battery 50 increases to or above a preset charge level Sref2 (for example, 53% or 55%), which is higher than the preset reference charge level Sref. When the engine 22 starts according to the output torque of the motor MG2 (previous Tm2*) (steps S190 and S220) or according to the torque demand Tr* (steps S200 and S220), the stop condition of the engine 22 is that the state of charge SOC of the battery 50 increases to or above a preset charge level Sref3 (for example, 50%), which is higher than the preset reference charge level Sref but is lower than the preset charge level Sref2. The start of the engine 22 independently of the state of charge SOC of the battery 50 enables the engine 22 to stop at the lower state of charge SOC of the battery 50, compared with the start of the engine 22 according to the state of charge SOC of the battery 50. This desirably enhances the energy efficiency.

In the hybrid vehicle 20 of the embodiment, the reference power level Pref is set to decrease with a decrease in state of charge SOC of the battery 50 as shown in the map of FIG. 4. The reference power level Pref may be set to a fixed value, independently of the state of charge SOC of the battery 50.

In the hybrid vehicle 20 of the embodiment, in response to a start requirement of the engine 22, the drive control determines whether there is a potential for backlash or gear rattle in the gear mechanism 37 or in the differential gear 38, based on the output torque of the motor MG2 (previous Tm2*). The object of such determination is, however, not restricted to the output torque of the motor MG2 (previous Tm2*). Any suitable amount may be used as the object of determination of whether there is a potential for backlash or gear rattle in the gear mechanism 37 or in the differential gear 38.

In the hybrid vehicle 20 of the embodiment, the drive control starts the engine 22 on condition that torque demand Tr* is not lower than the preset reference torque level Tref at the moment of a start requirement of the engine 22, even when the output torque of the motor MG2 (previous Tm2*) is lower than the preset reference output torque Tm2ref. One possible modification of the drive control may keep the engine 22 at a stop irrespective of the torque demand Tr*, when the output torque of the motor MG2 (previous Tm2*) is lower than the preset reference output torque Tm2ref.

In the hybrid vehicle 20 of the embodiment, the drive control starts the engine 22 on condition that the state of charge SOC of the battery 50 is lower than the preset reference charge level Sref at the moment of a start requirement of the engine 22, even when the output torque of the motor MG2 (previous Tm2*) is lower than the preset reference output torque Tm2ref. One possible modification of the drive control may keep the engine 22 at a stop irrespective of the state of charge SOC of the battery 50, when the output torque of the motor MG2 (previous Tm2*) is lower than the preset reference output torque Tm2ref.

Figure 7:
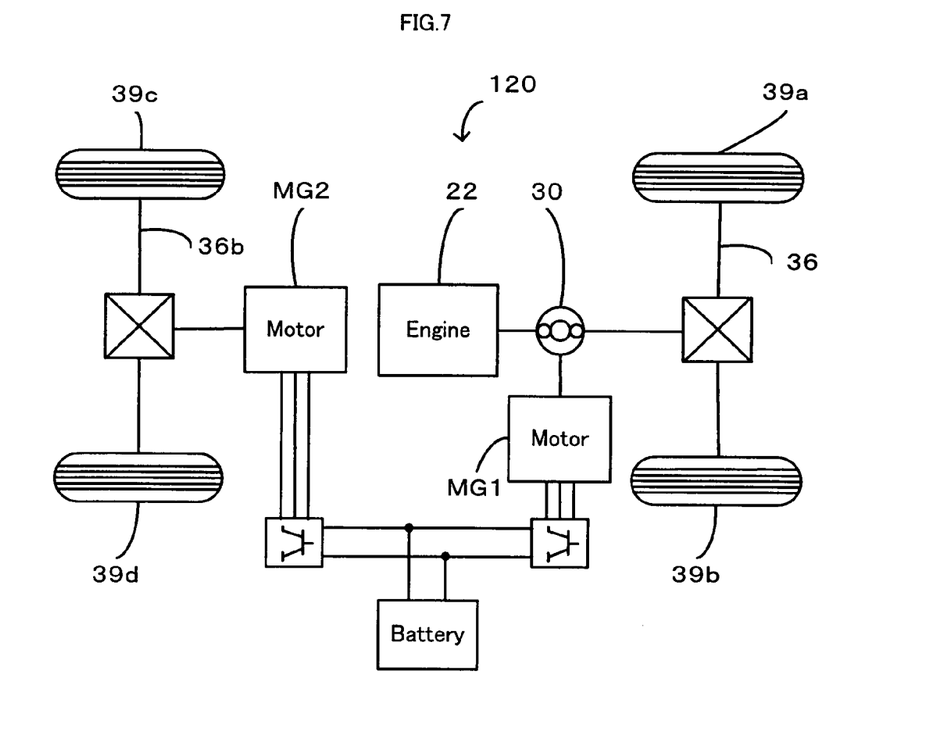
FIG. 7 schematically illustrates the configuration of another hybrid vehicle as one modified example.

In the hybrid vehicle 20 of the embodiment, the power of the motor MG2 is output to the ring gear shaft 32a or the driveshaft. In one possible modification shown as a hybrid vehicle 120 of FIG. 7, the power of the motor MG2 may be output to another axle (that is, an axle 36b linked with wheels 39a and 39b of FIG. 7), which is different from an axle connected with the ring gear shaft 32a (that is, an axle linked with the wheels 39a and 39b).

Figure 8:
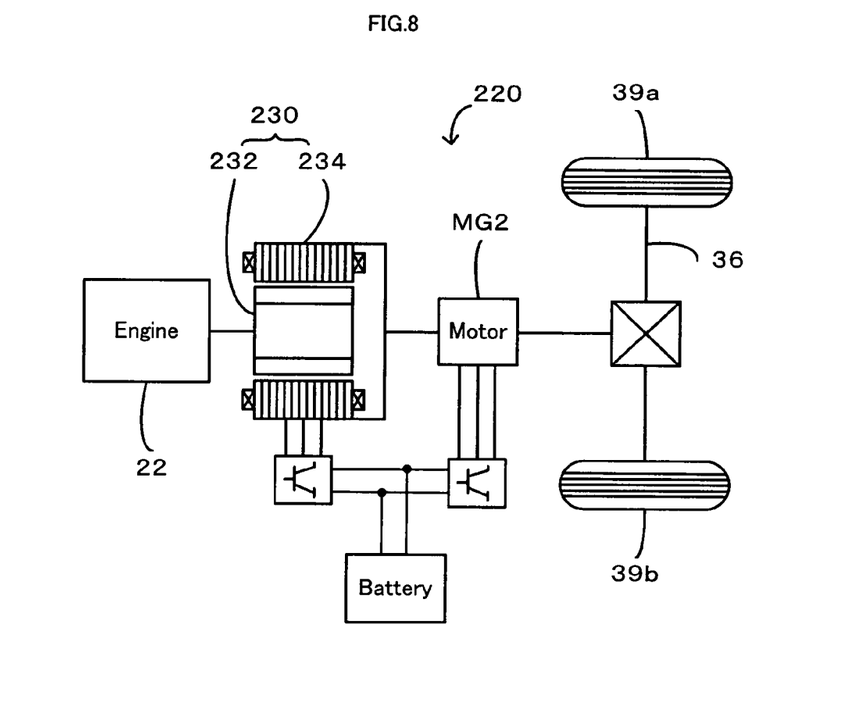
FIG. 8 schematically illustrates the configuration of still another hybrid vehicle as another modified example.

In the hybrid vehicle 20 of the embodiment, the power of the engine 22 is output via the power distribution integration mechanism 30 to the ring gear shaft 32a or the driveshaft linked with the drive wheels 39a and 39b. In another possible modification of FIG. 8, a hybrid vehicle 220 may have a pair-rotor motor 230, which has an inner rotor 232 connected with the crankshaft 26 of the engine 22 and an outer rotor 234 connected with the drive shaft for outputting the power to the drive wheels 39a, 39b and transmits part of the power output from the engine 22 to the drive shaft while converting the residual part of the power into electric power.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

INDUSTRIAL APPLICABILITY

The technique of the invention is preferably applicable to manufacturing industries of hybrid vehicles.

The invention claimed is:

1. A hybrid vehicle equipped with an internal combustion engine that is structured to output power to a driveshaft linked to an axle and with a motor that inputs and outputs power, said hybrid vehicle comprising:
an electric power-mechanical power input output mechanism that is connected to an output shaft of the internal combustion engine and to the driveshaft and outputs at least part of the output power of the internal combustion engine to the driveshaft through input and output of electric power and mechanical power;

a gear-based power transmission structure that connects the driveshaft with a rotating shaft of the motor via a gear mechanism to enable transmission of power between the driveshaft and the rotating shaft;

an accumulator unit that is capable of inputting and outputting electric power from and to the motor and the electric power-mechanical power input output mechanism;

a driving force demand setting module that sets a driving force demand to be output to the driveshaft;

a stop-start requirement module that gives a stop requirement of the internal combustion engine upon satisfaction of a preset operation stop condition and gives a start requirement of the internal combustion engine upon satisfaction of a preset operation start condition; and a control module that, on condition that a degree of backlash adjustment in the gear mechanism satisfies a predetermined condition at a moment of the start requirement given by said stop-start requirement module, controls the internal combustion engine, the electric power-mechanical power input output mechanism, and the motor to start the internal combustion engine and to ensure output of a driving force equivalent to the set driving force demand to the driveshaft, on condition that the degree of backlash adjustment in the gear mechanism fails to satisfy the predetermined condition at the moment of the start requirement, said control module controlling the internal combustion engine, the electric power-mechanical power input output mechanism, and the motor to keep the internal combustion engine at a stop regardless of the start requirement and to ensure output of the driving force equivalent to the set driving force demand to the driveshaft.

2. A hybrid vehicle in accordance with claim 1, wherein on condition that an output torque of the motor is not lower than a preset reference torque level at the moment of the start requirement, said control module specifies that the degree of backlash adjustment in the gear mechanism satisfies the predetermined condition and controls the internal combustion engine, the electric power-mechanical power input output mechanism, and the motor to start the internal combustion engine, on condition that the output torque of the motor is lower than the preset reference torque level at the moment of the start requirement, said control module specifying that the degree of backlash adjustment in the gear mechanism fails to satisfy the predetermined condition and controlling the internal combustion engine, the electric power-mechanical power input output mechanism, and the motor to keep the internal combustion engine at a stop.

3. A hybrid vehicle in accordance with claim 1, wherein on condition that the set driving force demand is not lower than a preset reference driving force level at the moment of the start requirement, said control module controls the internal combustion engine, the electric power-mechanical power input output mechanism, and the motor to start the internal combustion engine, independently of the degree of backlash adjustment in the gear mechanism.

4. A hybrid vehicle in accordance with claim 1, wherein on condition that a state of charge of the accumulator unit is lower than a preset reference charge level at the moment of the start requirement, said control module controls the internal combustion engine, the electric power-mechanical power input output mechanism, and the motor to start the internal combustion engine, independently of the degree of backlash adjustment in the gear mechanism.

5. A hybrid vehicle in accordance with claim 4, wherein under control to keep the internal combustion engine at a stop on conditions that the state of charge of the accumulator unit is not lower than the preset reference charge level and that the degree of backlash adjustment in the gear mechanism fails to satisfy the predetermined condition at the moment of the start requirement, when the state of charge of the accumulator unit decreases below the preset reference charge level, said control module controls the internal combustion engine, the electric power-mechanical power input output mechanism, and the motor to start the internal combustion engine, independently of the degree of backlash adjustment in the gear mechanism.

6. A hybrid vehicle in accordance with claim 1, said hybrid vehicle further comprising:

a power demand setting module that sets a power demand required for the driveshaft, based on the set driving force demand, wherein said stop-start requirement module sets a reference power level to decrease with a decrease in state of charge of the accumulator unit and, when the set power demand is higher than the reference power level, specifies satisfaction of the preset operation start condition to give the start requirement of the internal combustion engine.

7. A hybrid vehicle in accordance with claim 1, wherein the electric power-mechanical power input output mechanism comprises:

a three shaft-type power input output module that is linked to three shafts, the output shaft of the internal combustion engine, the driveshaft, and the rotating shaft of the motor, and automatically inputs and outputs power from and to a residual one shaft based on powers input from and output to any two shafts among the three shafts; and another motor that is capable of inputting and outputting power from and to the rotating shaft.

8. A hybrid vehicle in accordance with claim 1, wherein the electric power-mechanical power input output mechanism comprises:

a pair-rotor motor that has a first rotor connected to the output shaft of the internal combustion engine and a second rotor connected to the driveshaft, and is driven to rotate through relative rotation of the first rotor to the second rotor.

9. A control method of a hybrid vehicle, said hybrid vehicle comprising: an internal combustion engine; an electric power-mechanical power input output mechanism that is connected to an output shaft of the internal combustion engine and to a driveshaft and outputs at least part of output power of the internal combustion engine to the driveshaft through input and output of electric power and mechanical power; a motor that inputs and outputs power; a gear-based power transmission structure that connects the driveshaft with a rotating shaft of the motor via a gear mechanism to enable transmission of power between the driveshaft and the rotating shaft; and an accumulator unit that is capable of inputting and outputting electric power from and to the motor and the electric power-mechanical power input output mechanism, on condition that a degree of backlash adjustment in the gear mechanism satisfies a predetermined condition at a moment of a start requirement of the internal combustion engine given upon satisfaction of a preset operation start condition, said control method controlling the internal combustion engine, the electric power-mechanical power input output mechanism, and the motor to start the internal combustion engine and to ensure output of a driving force equivalent to a preset driving force demand to the driveshaft, on condition that the degree of backlash adjustment in the gear mechanism fails to satisfy the predetermined condition at the moment of the start requirement, said control method controlling the internal combustion engine, the electric power-mechanical power input output mechanism, and the motor to keep the internal combustion engine at a stop regardless of the start requirement and to ensure output of the driving force equivalent to the preset driving force demand to the driveshaft.

10. A control method in accordance with claim 9, on condition that an output torque of the motor is not lower than a preset reference torque level at the moment of the start requirement, said control method specifies that the degree of backlash adjustment in the gear mechanism satisfies the predetermined condition and controls the internal combustion engine, the electric power-mechanical power input output mechanism, and the motor to start the internal combustion engine, on condition that the output torque of the motor is lower than the preset reference torque level at the moment of the start requirement, said control method specifying that the degree of backlash adjustment in the gear mechanism fails to satisfy the predetermined condition and controlling the internal combustion engine, the electric power-mechanical power input output mechanism, and the motor to keep the internal combustion engine at a stop.

11. A control method in accordance with claim 9, on condition that the set driving force demand is not lower than a preset reference driving force level at the moment of the start requirement, said control method controls the internal combustion engine, the electric power-mechanical power input output mechanism, and the motor to start the internal combustion engine, independently of the degree of backlash adjustment in the gear mechanism.

12. A control method in accordance with claim 9, on condition that a state of charge of the accumulator unit is lower than a preset reference charge level at the moment of the start requirement, said control method controls the internal combustion engine, the electric power-mechanical power input output mechanism, and the motor to start the internal combustion engine, independently of the degree of backlash adjustment in the gear mechanism.

13. A control method in accordance with claim 12, under control to keep the internal combustion engine at a stop on conditions that the state of charge of the accumulator unit is not lower than the preset reference charge level and that the degree of backlash adjustment in the gear mechanism fails to satisfy the predetermined condition at the moment of the start requirement, when the state of charge of the accumulator unit decreases below the preset reference charge level, said control method controls the internal combustion engine, the electric power-mechanical power input output mechanism, and the motor to start the internal combustion engine, independently of the degree of backlash adjustment in the gear mechanism.

* * * * *